July 25, 1950 — D. W. ROSS ET AL — 2,516,344

RECTIFIER

Filed July 18, 1947

Inventors
DANIEL W. ROSS
JOHN J. HOPKINS

By
Attorney

Patented July 25, 1950

2,516,344

UNITED STATES PATENT OFFICE 2,516,344

RECTIFIER

Daniel W. Ross, Cleveland, Ohio, and John J. Hopkins, Silver Spring, Md., assignors to the United States of America as represented by the Secretary of the Navy Application July 18, 1947, Serial No. 761,884

2 Claims. (Cl. 175—366)

The present invention relates to rectifiers, and particularly to rectifiers having one or more rectifier elements carried by a plastic case. The invention also pertains to methods of manufacturing rectifiers.

The rectifier assembly comprises a tube made of thermo-plastic or thermo-setting material having a bore of proper diameter to accommodate the rectifier element. The tube is internally corrugated, threaded or otherwise designed to provide a strong frictional grip on electrodes forced or threaded into the tube, for making contact with the rectifier element. The ends of the tube are then constricted to prevent longitudinal movement of the internal parts.

In a modified form in which the rectifier contains two rectifier elements, a conductor extends laterally from the middle of the tube and two elements are placed back to back and in contact with the common conductor. Additional electrodes are then provided, as before, to make contact with the coated faces of the rectifier elements, and the ends of the tube closed by constricting them above the conductors of the electrodes.

In order to disclose the invention in detail, a sample of each type has been selected and is illustrated in the accompanying drawing wherein.

Figure 1:
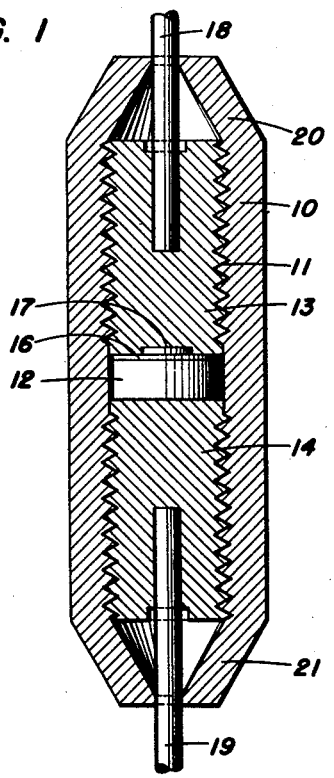
Fig. 1 is a longitudinal sectional view of an encased single-unit rectifier.

Referring first to Fig. 1, the assembly consists of a tube 10 made of uncured thermo-plastic or thermo-setting composition, such as a mixture of "Durez" resin (a product of the Durez Resin Company), asbestos float, and silica sand or similar materials.

The tube is internally roughened, as by threads, corrugations, or the like, as indicated at 11, and is originally open at both ends to admit the internal components of the rectifier. These components comprise the rectifier element 12 and metal inserts 13 and 14, the inserts being secured in place to make contact with the opposite faces of the element 12 in any suitable way, as by screwing them into position or by a close fit.

The element 12 has an active surface 16, comprising a coating of selenium or other suitable material; the electrode insert 13, which bears against the surface 16, may have a cup portion 17 to relieve the pressure on the surface 16. Conductors or leads 18 and 19 are suitably connected to the electrodes or inserts 13 and 14, for example by embedding them inside the electrodes, as shown.

The ends 20 and 21 of the tube are then closed tightly against the leads 18 and 19, by crimping or other means, and the whole assembly subjected to a suitable heat treatment to produce hardening of the composition in any known way.

Figure 2:
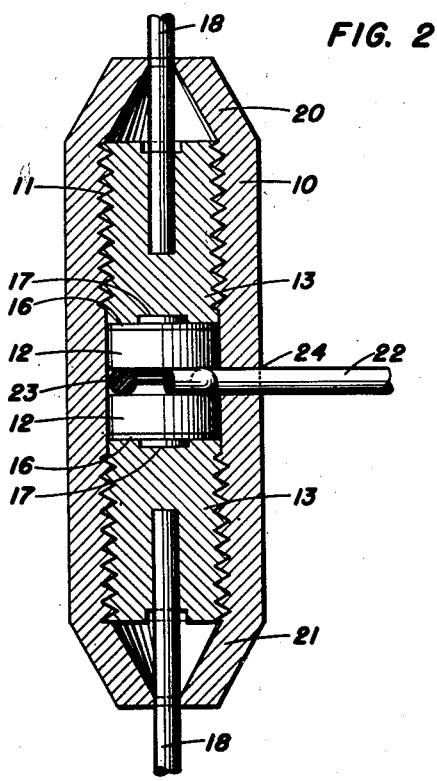
Fig. 2 is a longitudinal sectional view of a rectifier assembly containing two rectifier elements.

The modified form shown in Fig. 2 is essentially the same as that described above, except that an additional conductor 22 is provided and two rectifier elements are used.

The conductor 22 conveniently has an eyelet 23 at one end as shown. This conductor may be inserted at the middle of the tube 10 through an opening 24, and bent as necessary. The two rectifier elements 12, 12 are then inserted to abut the opposite faces of said eyelet, and the electrodes 13, 13 then inserted. The tube is then closed and heat-treated as above described.

The double-unit type has chiefly the advantage of economy of space in accommodating two rectifier elements in the same volume required by a single one. The conductor 22 is, of course, a common lead for both units. Similar parts in Figs. 1 and 2 are designated by the same reference characters. Attention is also directed to the fact that while in Fig. 2 the two rectifier elements 12, 12 are in back-to-back relation to each other, that is not the only way in which they may be arranged; for instance, they may have active faces 16, 16 facing each other, or they may both face in the same direction, the conductors being rearranged as necessary, to make the desired connections to the rectifier elements.

Figure 3:
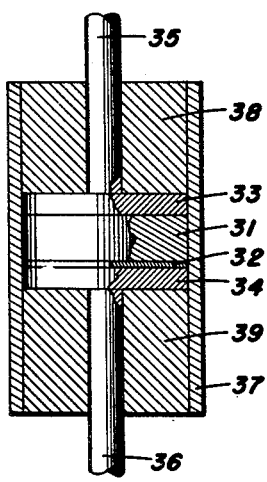
Figs. 3 and 4 are longitudinal sectional views of two additional modifications of rectifiers made in accordance with the present invention.

Fig. 3 represents another modification of the rectifiers of the present invention and will be used to describe one of the preferred methods of manufacture thereof. The rectifier element itself is the disk 31 having a coating 32 on one face thereof of selenium or other suitable material having the desired rectifying properties. The rectifier element itself does not form a part of the present invention and therefore will not be described in detail herein.

Contact is made with the opposite faces of the rectifier element by two similar electrodes 33 and 34 carried by conductors 35 and 36 respectively. The electrodes are preferably made integral with the conductors, being similar to common wire nails in structure, and preferably of copper. The electrodes and rectifier are assembled in a tube 37 previously molded of an uncured thermo-setting or thermo-plastic resin, for example resins of the phenol-formaldehyde type. Specifically, it has been found that "Durez" resin may be used to advantage for this purpose. According to one method of manufacture of the present invention, the internal components of the rectifier assembly are placed within the tube 37 and the end portions thereof are then filled with plugs as 38 and 39 composed of more of the uncured plastic composition. The entire assembly is then subjected to a heat treatment to bring about the polymerization or condensation necessary to render the finished product capable of withstanding the shocks encountered in ordinary handling. Where low-melting metals are employed at the active face of the rectifier element care must be exercised to prevent the curing temperature from exceeding the melting point of such metal to prevent destruction of the rectifying properties of the element. For example, where selenium is used, the curing temperature is maintained at approximately 90° C.; when "Durez" resin is employed as the plastic composition, the curing time is at least 12 hours.

In order to reduce the brittleness of the finished rectifier assembly, and/or to increase its resistance to shock and other stresses, the plastic composition may be modified through the addition of excipients, fillers or other addition agents. It has been found, for example, that the following plastic composition is characterized by great resistance to shock, while retaining satisfactory molding properties:

| Components | Percentage Composition |
|---|---|
| Durez Resin 11623 | 25 |
| Asbestos Float | 25 |
| Silica Sand 1160 | 50 |

Figure 4:
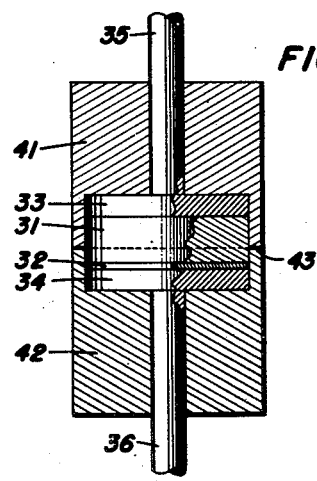

According to another method of manufacture contemplated by the invention, the rectifier case is made up of two preformed plastic cup portions 41 and 42 which are designed to receive the internal rectifier components as shown in Fig. 4. The cups are so designed that when the internal rectifier components are placed therein a constant predetermined pressure may be maintained between the electrodes 33 and 34 and the rectifier element 31. When Durez 11623 is used as the plastic constituent of the case portions 41 and 42, it has been found advantageous to heat the assembled rectifier unit for approximately one minute at 150° C. to bring about a bond at the inter-face 43 between the mating cup portions. Thereafter, the rectifier assembly is treated for 12 hours at approximately 90° C. to bring about the necessary polymerization or condensation of the Durez resin. Of course, where the resin employed is thermo-plastic, this prolonged curing period is unnecessary, and only sufficient heat and time that will assure a firm bond between the cup portions are necessary.

In the specification and claims, it will be understood that the term "uncured" plastic applies to a plastic to which an additional processing step or steps must be applied to impart thereto those properties desired in the final form. Thus, for thermo-setting plastics the curing operation will be one in which the plastic is permitted to undergo polymerization or condensation; where the plastic employed is thermo-plastic the curing operation is principally designed to produce a firm bond between the several plastic parts and to assure homogeneity throughout the plastic body.

While what has been described is particularly illustrative of what at present is considered to be a preferred embodiment of the invention, it is not intended that the scope of the invention be limited thereto but that it embrace any modifications and changes which fall within the true spirit of the invention, as covered by the claims.

What is claimed is:

1. The process of making a rectifier which comprises placing a rectifying element of the disk type between two conductors, placing a pair of cups of uncured plastic over said rectifying element and the ends of said conductors contacting said element with the open ends of said cups in contact with one another, and heat treating the entire assembly to form a bond between said cups and to cure the plastic.

2. The process described in claim 1 in which the heat treating step comprises a first stage in which the entire rectifier assembly is heated for about one minute at about 150° C. to effect a bond between the cups, and a second stage in which the assembly is maintained at substantially 90° C. for about 12 hours to cure the plastic.

DANIEL W. ROSS.
JOHN J. HOPKINS.

REFERENCES CITED

The following references are of record in the file of this patent:

UNITED STATES PATENTS

| Number | Name | Date |
|---|---|---|
| 1,649,741 | Ruben | Nov. 15, 1927 |
| 1,751,360 | Ruben | Mar. 18, 1930 |
| 2,423,091 | Fiore et al. | July 1, 1947 |
| 2,433,566 | Lamb | Dec. 30, 1947 |
| 2,468,845 | Thompson | May 3, 1949 |